March 9, 1965  W. STELZER  3,172,706

FLUID PRESSURE MOTOR CONTROL SYSTEM

Filed April 10, 1962  2 Sheets-Sheet 1

INVENTOR
William Stelzer

BY John F. Phillips
ATTORNEY

March 9, 1965 W. STELZER 3,172,706
FLUID PRESSURE MOTOR CONTROL SYSTEM
Filed April 10, 1962 2 Sheets-Sheet 2
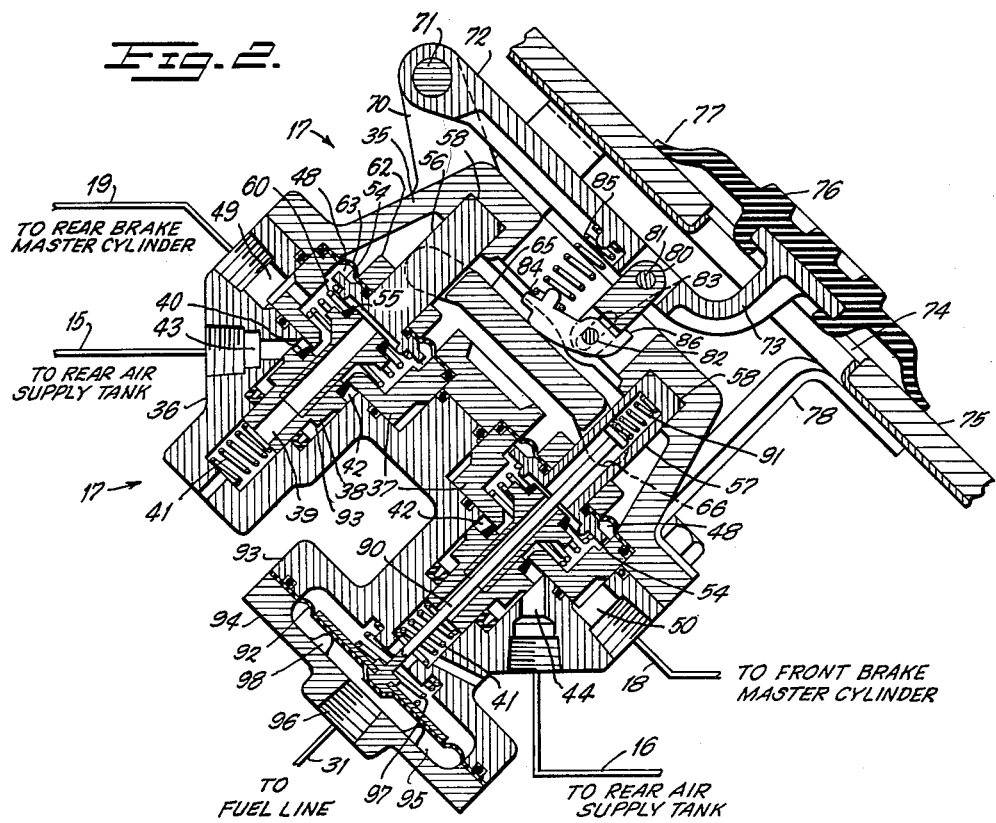
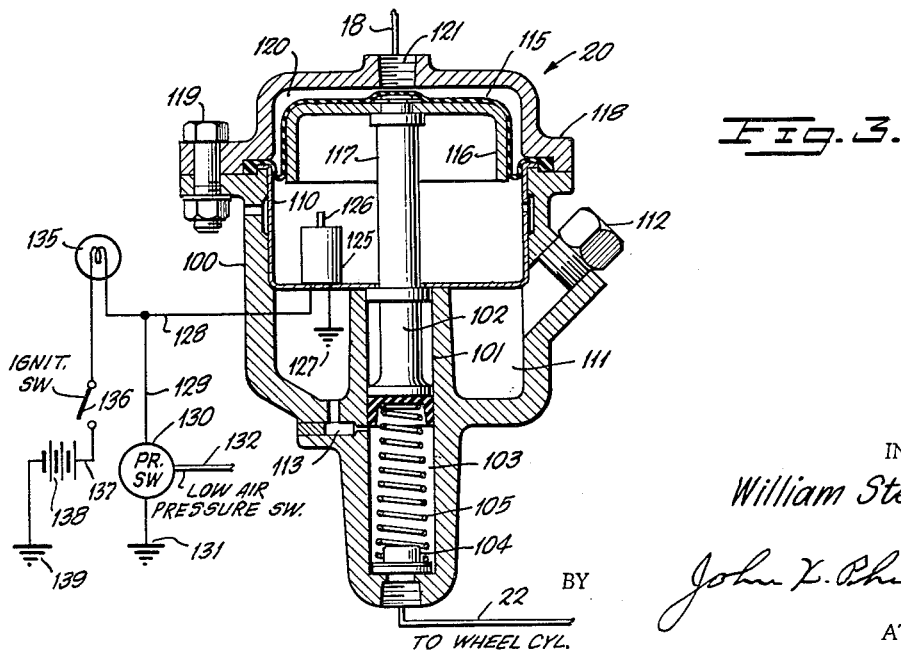
INVENTOR
William Stelzer
ATTORNEY

United States Patent Office 3,172,706
Patented Mar. 9, 1965

3,172,706
FLUID PRESSURE MOTOR CONTROL SYSTEM
William Stelzer, Bloomfield Hills, Mich., assignor to Kelsey-Hayes Company, Romulus, Mich., a corporation of Delaware
Filed Apr. 10, 1962, Ser. No. 186,417
6 Claims. (Cl. 303—6)

This invention relates to a fluid pressure motor control system and has particular reference to such a system adapted for use in the power operation of hydraulic vehicle brakes.

An important object in the invention is to provide a full power brake system, as distinguished from a booster system, of such novel nature that upon a failure in the operation of one set of wheel brakes, the remaining wheel brakes will be fully operative.

A further object is to provide such a system which incorporates vehicle weight transfer compensation means to proportion the distribution of braking between the front and rear axles in exactly the same manner as the weight transfer takes place.

A further object is to provide separate fluid pressure control mechanisms for separate fluid pressure motors which are utilized for operating individual master cylinders, and to provide novel means for operating the valve mechanisms from a single brake pedal pad.

A further object is to provide such a system wherein the master cylinders are fully power operated and wherein operation of the brake pedal pad for progressively applying the brakes varies the degree of application of the brakes, increasing pressure being supplied to the motor for applying the front wheel brakes and decreasing pressure being supplied to the motor which operates the rear brakes.

A further object is to provide a system of this general character having novel means for transmitting reaction to the brake pedal pad and wherein the reaction is greater during low speed braking when the brakes are more effective and produce greater deceleration, and wherein the reaction relatively decreases at high speed braking.

A further object is to provide a novel combination of control elements wherein the reaction means referred to cooperates with the controlling of the valve mechanism which controls the fluid pressure motor for applying the front brakes so that the most desirable braking effect may be secured under any vehicle operating conditions.

Other objects and advantages of the invention will become apparent during the course of the following description.

In the drawings I have shown one embodiment of the invention. In this showing

FIGURE 2 is an enlarged central sectional view longitudinally through the control valve mechanisms showing the connection thereof to the pedal pad, and FIGURE 3 is a sectional view of one of the fluid pressure motor operated master cylinder units, an electrically operated warning system being shown diagrammatically.

Figure 1:
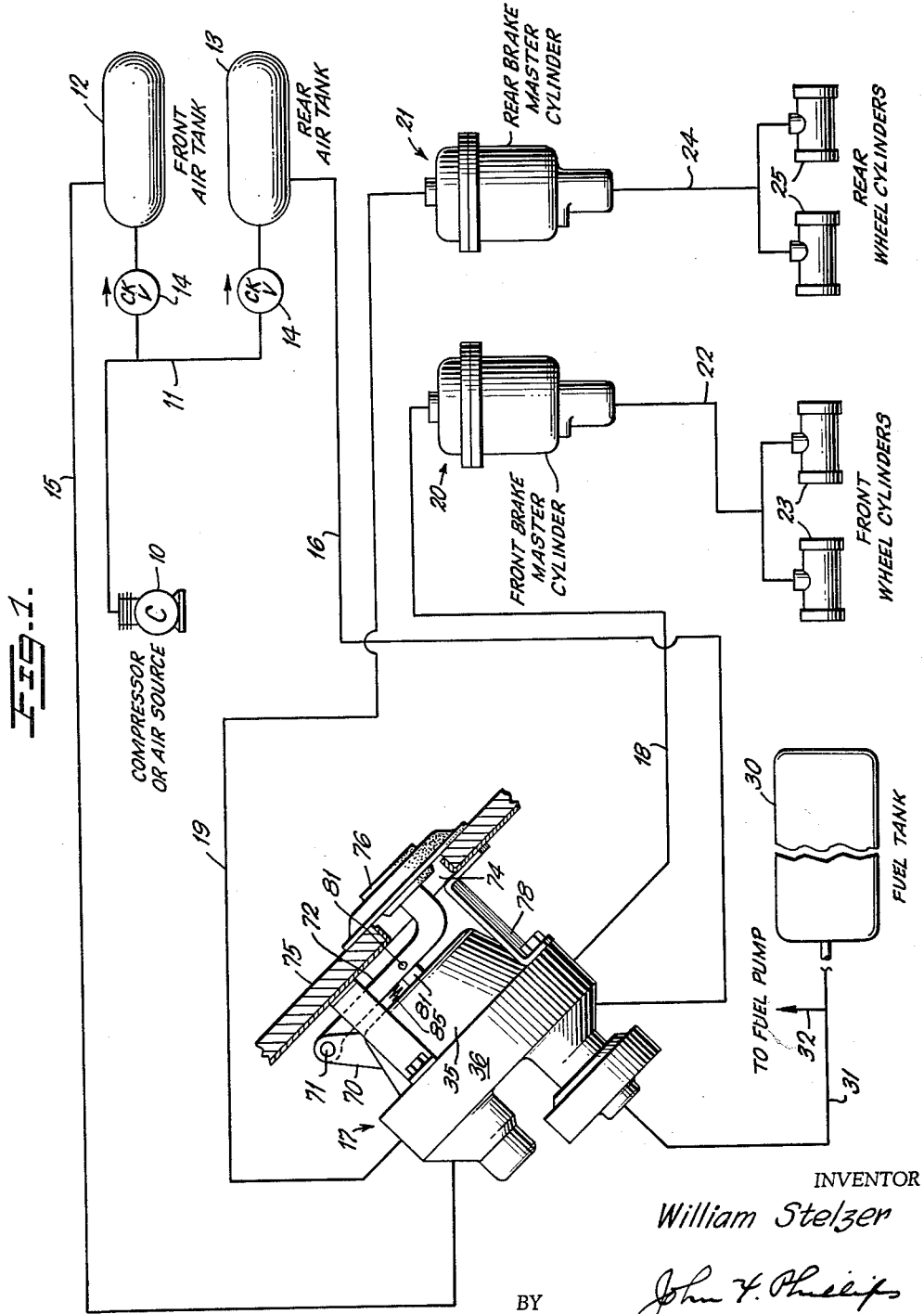
FIGURE 1 is a representation in side elevation of the control valve mechanism and fluid pressure motor operated master cylinder units, the remainder of this system being shown diagrammatically.

The present system is adapted for operation from a source or sources of superatmospheric pressure, and referring to FIGURE 1 the numeral 10 designates a compressor suitably connected as at 11 to front and rear air tanks 12 and 13, the lines to such tanks being provided with conventional check valves 14. The air tanks are connected respectively by lines 15 and 16 to a control valve mechanism indicated as a whole by the numeral 17 and referred to in detail below. Fluid pressure lines 18 and 19 lead respectively to front and rear fluid pressure motor operated master cylinders respectively indicated as a whole by the numerals 20 and 21, described in detail below. The unit 20 is connected as at 22 to the front wheel brake cylinders 23, while the unit 21 is similarly connected as at 24 to the rear wheel brake cylinders 25.

The complete combination described below utilizes the forward surging of a liquid, under vehicle deceleration conditions, for applying reaction to the pedal pad in a manner to be described. To this end, the vehicle is provided with a fuel tank 30 having a forwardly longitudinally extending pipe line 31 from which a branch 32 leads to the vehicle fuel pump. The utilization of a forwardly surging liquid under vehicle decelerating conditions is described and claimed in my copending application Serial No. 100,957 filed April 5, 1961, but is utilized in a different manner and in a different combination than the present invention.

Referring to FIGURE 2, the valve mechanism 17 as a whole comprises upper and lower casing sections 35 and 36 which house the two individual valve mechanisms for the motors of the units 20 and 21. Most of such mechanisms are identical and only one will be described in detail, it being understood that the same reference characters apply to the same parts in the two valve mechanisms. The two casing sections clamp therebetween valve seat members 37 each being axially apertured for the projection therethrough of a two-part valve body 38, the elements of which are pressed together. Each valve body is axially bored to provide a passage 39 and each carries a pressure valve 40 engageable with the associated seat 37. Such valve is biased to closed position by a spring 41. A pressure chamber 42 is formed around each valve 40, one of these chambers communicating through a port 43 with the line 15, and the other chamber 42 communicating through a port 44 with the line 16.

Above the bottom of each valve seat member 37 is formed a chamber 48 one of which communicates through a port 49 with the line 19 leading to the unit 21. The other chamber 48 communicates through a port 50 with the line 18 leading to the unit 20. A valve seat member 54 is mounted coaxially with each valve body 38 and is normally spaced from an exhaust valve 55 carried by each valve body 38. The valve seat members 54 carry coaxial stems one of which, 56, may be solid and the other of which, 57, is axially bored for a purpose to be described. Movement of the valve body 54 upwardly and to the right in FIGURE 2 is limited by engagement of the stems 56 and 57 in stop sockets 58 formed in the body 35. Each of the valve seat members 54 is biased upwardly and to the right by a spring 60.

Each of the stems 56 and 57 is provided with a collar 62 pressed thereon and cooperating with the associated valve seat member 54 to clamp therebetween a diaphragm 63, the outer periphery of which is clamped between the body 35 and the associated valve seat member 37.

A rocking beam or whiffletree 65 is forked at its ends as at 66 to straddle the stems 56 and 57 in engagement with the respective collars 62. Force is applied to the beam 65 between the ends thereof to effect movement of the valve seats 54 into engagement with the valves 55 and then open the valves 40, in a manner to be described.

The housing 35 is provided with angularly projecting ears 70 carrying a pivot pin 71 for pivotally connecting thereto a pedal lever 72. This lever has its free end projecting angularly as at 73 through an opening 74 in the vehicle toe board 75, and on the free end of the pedal lever is mounted a pedal pad 76 having finned edges 77 seating on the toe board to close the opening 74. It will become apparent that the pedal pad 76 partakes of only slight movement, and such movement is permitted by the flexible finned edges of the pedal pad. The valve mechanism as a whole is supported with respect to the toe board 75 by suitable rigid brackets 78.

A link 80 is pivoted as at 81 to the pedal lever 72 and has at its lower end a pivot pin 82 the ends of which are guided in a slot 83 formed in the body 35. A rolling cam 84 is carried by the pivot pin 82 and is biased to turn in a counter-clockwise direction by a spring 85. Such turning movement is limited by a stop 86 carried by the cam 84 and engageable with the link 80. It will become apparent that depression of the pedal pad 76 applies force through the cam 84 to the rocking beam 65, and such force is applied to progressively changing points along the cam 84 in accordance with the pressure delivered to the pin 82 from the pedal pad 76, as described below.

A stem 90 projects into the bore of the stem 57 and through the bore of the associated valve body 38. A spring 91 at the upper end of this stem biases it downwardly. The stem 90 projects through the bottom of the casing 36 and carries a diaphragm 92 the peripheral portion of which is clamped between an angular enlargement 93 on the body 36 and a cap 94, secured in any suitable manner to the enlargement 93. The diaphragm 92 forms with the cap 94 a chamber 95 communicating through a port 96 with the forward end of the fuel line 31. A spring 97 biases the diaphragm 92 downwardly into engagement with stop members 98 formed in the cap 94. The spring 91 is lighter and has a lower rate than the spring 97, the higher rate of the latter spring being such that force increases quickly as the spring 97 is compressed. In the released position shown in FIGURE 2 the spring 97 is free so that in the initial brake application, all of the force of pressure in the chamber 98, as described below, is transmitted through the spring 91 to react on the beam 65.

One of the fluid pressure motor operated units 20 or 21 is shown in FIGURE 3. Each such unit comprises a main body 100 in which is formed a master cylinder bore 101 having a fluid displacing plunger 102 slidable therein. The lower end of the bore 101 forms a pressure chamber 103 in which fluid pressure is built up upon downward movement of the plunger 102 to displace fluid past a residual pressure valve 104 into one of the lines 22 or 24. A spring 105 biases the plunger 102 to its upper normal position.

A cylinder 110 is mounted in the top of the body 100 and the space in such body below the cylinder 110 forms a reservoir 111, adapted to be filled through a plug 112 and communicating with the chamber 103 through a replenishing port 113.

A rolling diaphragm 115 is mounted on a cup 116, these elements forming the pressure responsive unit of one of the brake operating motors, the cup 116 being fixed to the upper end of an axial extension 117 on the plunger 102. The periphery of the diaphragm 115 is clamped between the upper end of the body 100 and a cap 118 fixed to the body 100 as at 119. The space between the cap 118 and diaphragm 115 forms a motor pressure chamber 120 communicating through a port 121 with one of the lines 18 or 19.

Means are provided for warning the operator of a drop of fluid pressure in the source or of the movement of one of the motor pressure responsive units beyond its normal limit, which occurs due to a loss of fluid in the associated hydraulic lines. A switch 125 is mounted in the cylinder 110 of each motor and has a switch element 126 engageable with the associated cup 116 if the latter moves beyond its normal limit of movement thus closing the switch 125. One terminal of the switch is grounded as at 127 and the other is connected to a line 128, branched as at 129 to be connected to one terminal of a low pressure switch 130 having its other terminal grounded as at 131. The switch 130 is adapted to be closed upon a drop in pressure in the source or in either of the tanks 12 and 13, to which the switch 130 is connected by a line 132.

The line 128 is connected to a signal light 135 the second terminal of which is connected to the vehicle ignition switch 136 the fixed terminal of which is connected by a wire 137 to the vehicle battery 138, grounded as at 139.

*Operation*

The parts normally occupy the positions shown in FIGURES 2 and 3. Both pressure valves 40 will be closed and accordingly both pressure lines 15 and 16 will be cut off from the chambers 48. Both atmospheric valves 55 will be open, and accordingly the master cylinder motor pressure chambers 120 (FIGURE 3) will be open to the atmosphere through the bores of the valve bodies 38 and the vent openings communicating therewith.

The stop member 86 (FIGURE 2) will engage the link 80 to limit counter-clockwise turning movement of the cam 84, and the spring 85 tends to turn the cam 84 in such direction to maintain it in engagement with the beam 65. It will be noted at this time that the point of contact between the cam 84 and beam 65 will be approximately centrally of the space between the axes of the valve devices.

Accordingly, when the pedal pad 76 is initially depressed, force will be applied through the cam 84 by the link 80 and spring 85, and this force applied centrally of the axes of the valve devices will exert the same force on both collars 62 to move the valve seats 54 downwardly into engagement with the atmospheric valves 55. This cuts off communication between the master cylinder motor lines 18 and 19 and the atmosphere. Slight further depression of the pedal pad will then crack both pressure valves 40 to admit pressure into the motor lines 18 and 19. Pressure fluid entering the chambers 120 (FIGURE 3) of each motor will move the diaphragm 115 thereof downwardly to actuate the plunger 102 and thus displace fluid from the associated chamber 103 to the separate sets of wheel cylinders 23 or 25 (FIGURE 1).

The spring 85 has a definite rate and force so that at the beginning of a brake application the cam 84 contacts the beam 65 near its center, and as brake application progresses, the reactionary force between the beam 65 and cam 84 causes the latter to turn clockwise about its pivot 82. The reactionary force is provided by pressure in the chambers 48 acting against the diaphragms 63, such force being more directly applied by the stem 57 as the cam contact point progressively approaches such stem. At maximum braking, the contact point between the cam 84 and beam 65 comes substantially into alignment with the longitudinal center line of the link 81. The lever ratio of the beam 65 thus gradually changes between initial and maximum braking.

It is pointed out that the present mechanism is designed particularly for the operation of fluid pressure motors 20 and 21 from a source or sources of superatmospheric pressure. Thus it is necessary to depress the pedal pad 76 only a relatively short distance for the full actuation of the motors 20 and 21, such operation taking place through the opening of the pressure valves 40 as described above.

As increased force is exerted against the pedal pad 76, the cam 84 gradually turns clockwise to shift its point of contact with the beam 65, and relatively greater valve-operating forces will be delivered to the lower or right-hand collar 62 than to the other collar. Through the greater cracking of the valve 40 associated with the pressure line 18, greater pressures will be built up in the motor 20, and accordingly greater front wheel cylinder operating pressure will be developed in the chamber 103 of the motor 20 than in the corresponding chamber of the motor 21. Thus the mechanism, aside from features discussed below, operates progressively as brake application increases to increase the braking at the front wheels more rapidly than at the rear wheels, which is highly desirable.

The means which controls the cam 84 thus functions substantially in the nature of a means compensating for vehicle weight transfer as vehicle deceleration takes place.

The mechanism employs a second means for weight transfer compensation comprising the diaphragm 92 (FIGURE 2) and associated elements. As described below, the diaphragm 92 transmits reaction to the stem 57 and thus to the associated end of the beam 65 to be transmitted through the cam 84 and link 80 to the pedal lever and pad. The force for transmitting such reaction is provided in the chamber 95 which is connected to the forward end of a longitudinally extending portion of the fuel line 31. As vehicle deceleration takes place, the forward surging of fuel in the line 31 increases the pressure in the chamber 95 and thus increases the reaction transmitted to the pedal pad.

The rates and forces of the springs 91 and 97 are in fixed relation to each other and they are proportioned correctly so that at the beginning of a brake application the full force of the pressure against the diaphragm 92 is transmitted through the spring 91 to oppose valve operating movement of the adjacent end of the beam 65. At maximum braking, only a fraction of the force is transmitted to the beam 65, the remainder being taken by the spring 97 against the valve body 35. Therefore, the spring 91 is lighter and has a lower rate. The spring 97 is heavier and has a higher rate so that its force increases quickly as it is being compressed. In the released position shown, the spring 97 is relaxed, and it is for this reason that in the initial stages of brake application all of the forces acting on the diaphragm 92 are transmitted to the associated end of the beam 65. This is a highly advantageous feature since at relatively low vehicle speeds the brakes are more effective for decelerating the vehicle and it is in this stage that reaction provided by the diaphragm 92 is at its maximum.

If both compensating means are employed, namely the cam 84 and the diaphragm 92, they must be proportioned so that together they produce the desired result, since each functions to tend to change the ratio between front and rear braking. Thus in the embodiment shown, the hydraulic pressure to the rear brakes may be greater than that transmitted to the front brakes, for example due to the reaction provided by the diaphragm 92. However if the rear wheel cylinders are smaller in area the braking effect will be greater in the front, and accordingly it will be apparent that the wheel cylinders, master cylinders and valves are interdependent and must be proportioned so that the braking effect is kept in the proper relation with the weight on the wheels.

The operations which take place when the pedal pad 76 is released will be rather apparent. The springs 60 move the stems 56 and 57 upwardly to allow for the closing of the pressure valves 40 and to effect the opening of the atmospheric valves 55, thus establishing atmospheric pressure in the motor chambers 120 of both motors 20 and 21. The springs 105 will return to normal positions the master cylinder plungers 102 and diaphragms 115.

The two tanks 12 and 13 serving as pressure reservoirs, are preferably both employed as a safety measure so that if the immediate source of pressure for one of the motors 20 or 21 fails, there will be pressure available for the other motor. It will be apparent that the present invention is not dependent on the use of two air tanks.

If for any reason pressure in one of the master cylinder chambers 103 (FIGURE 3) should fail due to loss of hydraulic fluid, the associated motor diaphragm 115 will move downwardly beyond its normal limit and operate the switch element 126. With the ignition switch 136 closed, a circuit will be completed from the source 138 through the visual signal 135 to apprise the operator of the partial failure of the system. A line 132 (FIGURE 3) and its low pressure switch 130 and associated elements, of course, are used for each of the motors 20 and 21. These lines 132 may be tapped into the respective lines 15 or 16 or into the respective air tanks 12 or 13. In the event of a drop in pressure in either of the air tanks, with the ignition switch 136 closed, a circuit will be completed through the visual signal 135, again apprising the operator of a fault in the system.

From the foregoing it will be apparent that the present mechanism provides a novel control system for two motors, each connected to a master cylinder plunger or other element to be operated, together with separate valve mechanisms for operating the motors and a single manual control element, specifically the pedal pad 76, for controlling operation of the two valve mechanisms. It also will be apparent that the mechanism provides automatic means, as the motors are progressively energized for increasing the rate of energization of one motor relative to the other, this taking place through the functioning of the cam 84. Additionally it will be apparent that, used as a brake operating mechanism, the functioning of the cam 84 is in the nature of a weight transfer compensating means for increasing the braking of one set of vehicle wheels relative to the other. Moreover, the diaphragm 92 and associated elements constitute means, in a brake operating system, acting in conjunction with the cam means just referred to, for reacting against the manually operable element 76, specifically to a greater extent during earlier stages of brake actuation than in latter stages, which is highly desirable for the reasons stated.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A motor vehicle hydraulic brake system comprising a pair of fluid pressure motors each having a pressure responsive unit and each provided with a pressure chamber at one side of said pressure responsive unit, a hydraulic master cylinder connected to each pressure responsive unit and connected to one set of vehicle wheel cylinders, a pair of valve devices each operable for connecting the pressure chamber of one motor to a source of pressure, a single manually operable device movable from a normal position to simultaneously operate said valve devices, and means responsive to vehicle inertia occurring during vehicle deceleration for opposing movement of one of said valve devices to provide said manually operable device with reaction.

2. A motor vehicle hydraulic brake system comprising a pair of fluid pressure motors each having a pressure responsive unit and each provided with a pressure chamber at one side of said pressure responsive unit, a hydraulic master cylinder connected to each pressure responsive unit and connected to one set of vehicle wheel cylinders, a pair of valve devices each operable for connecting the pressure chamber of one motor to a source of pressure, a single manually operable element, means connecting such element to both valve devices for the simultaneous operation thereof, such means being constructed to impart progressively greater motor-energizing movement to one valve device than to the other as said manually operable element is progressively moved away from a normal position, and means responsive to the rate of vehicle deceleration for opposing movement of said one valve device to thereby provide reaction against movement of said manually operable element.

3. A motor vehicle hydraulic brake system comprising a pair of fluid pressure motors each having a pressure responsive unit and each provided with a pressure chamber at one side of said pressure responsive unit, a hydraulic master cylinder connected to each pressure responsive unit and connected to one set of vehicle wheel cylinders, a pair of valve devices each operable for connecting the pressure chamber of one motor to a source of pressure, a single manually operable device movable from a normal position to simultaneously operate said valve devices, means tending to oppose movement of one of said valve devices in accordance with movement imparted thereto by said manually operable device to thereby react against such device, and means operable in accordance with the rate of vehicle deceleration for further opposing movement of said one valve device.

4. A motor vehicle hydraulic brake system comprising a pair of fluid pressure motors each having a pressure responsive unit and each provided with a pressure chamber at one side of said pressure responsive unit, a hydraulic master cylinder connected to each pressure responsive unit and connected to one set of vehicle wheel cylinders, a pair of valve devices each operable for connecting the pressure chamber of one motor to a source of pressure, a single manually operable element, means connecting such element to both valve devices for the simultaneous operation thereof, such means being constructed to impart progressively greater motor-energizing movement to one valve device than to the other as said manually operable element is progressively moved away from a normal position, means tending to oppose movement of said one valve device by said manually operable element to thereby react against such element, and supplementary reaction means for opposing movement of said manually operable element for moving said one valve device and responsive to the rate of vehicle deceleration.

5. A motor vehicle hydraulic brake system comprising a pair of fluid pressure motors each having a pressure responsive unit and each provided with a pressure chamber at one side of said pressure responsive unit, a hydraulic master cylinder connected to each pressure responsive unit and connected to one set of vehicle wheel cylinders, a pair of valve devices each operable for connecting the pressure chamber of one motor to a source of pressure, a single manually operable device movable from a normal position to simultaneously operate said valve devices, and means responsive to vehicle inertia occurring during vehicle deceleration for opposing movement of one of said valve devices to provide said manually operable device with reaction, said means comprising an element responsive to the rate of vehicle deceleration and connected to said one valve device, and a spring opposing movement of said element, said spring having a relatively high rate and being normally relaxed whereby it increasingly opposes movement of said element under increasing rates of vehicle deceleration.

6. A motor vehicle hydraulic brake system comprising a pair of fluid pressure motors each having a pressure responsive unit and each provided with a pressure chamber at one side of said pressure responsive unit, a hydraulic master cylinder connected to each pressure responsive unit and connected to one set of vehicle wheel cylinders, a pair of valve devices each operable for connecting the pressure chamber of one motor to a source of pressure, a single manually operable element, means connecting such element to both valve devices for the simultaneous operation thereof, such means being constructed to impart progressively greater motor-energizing movement to one valve device than to the other as said manually operable element is progressively moved away from a normal position, and means responsive to the rate of vehicle deceleration for opposing movement of said one valve device to thereby provide reaction against movement of said manually operable element, said last named means comprising a deceleration responsive element connected to said one valve device to oppose motor-energizing movement thereof under vehicle decelerating conditions, and a spring opposing movement of said deceleration responsive element, said spring having a relatively high rate and being normally relaxed whereby it increasingly resists movement of said deceleration responsive element as the rate of vehicle deceleration progressively increases.

References Cited in the file of this patent
UNITED STATES PATENTS

| | | |
|---|---|---|
| 2,041,884 | Vorech et al. | May 26, 1936 |
| 2,976,084 | Brueder | Mar. 21, 1961 |

FOREIGN PATENTS

| | | |
|---|---|---|
| 1,195,410 | France | May 19, 1959 |